(12) United States Patent  
Bhide (10) Patent No.: US 6,564,214 B1  
(45) Date of Patent: May 13, 2003

(54) METHOD OF SEARCHING A DATA RECORD FOR A VALID IDENTIFIER

(75) Inventor: Chandrashekhar Bhide, Palo Alto, CA (US)

(73) Assignee: Visual Networks Technologies, Inc., MD (US)

( * ) Notice: Subject to any disclaimer, the term of this patent is extended or adjusted under 35 U.S.C. 154(b) by 315 days.

(21) Appl. No.: 09/605,680

(22) Filed: Jun. 28, 2000

(51) Int. Cl.$^7$ ............................................. G06F 17/30
(52) U.S. Cl. ............................................. 707/6; 707/2
(58) Field of Search ................ 707/2, 5, 6; 709/223, 709/226

(56) References Cited

U.S. PATENT DOCUMENTS

| | | | | |
|---|---|---|---|---|
| 5,905,782 A | * | 5/1999 | Lee et al. | 379/100.01 |
| 5,944,787 A | * | 8/1999 | Zoken | 709/206 |
| 6,282,658 B2 | * | 8/2001 | French et al. | 713/201 |
| 6,381,329 B1 | * | 4/2002 | Uppaluru et al | 379/266.04 |
| 6,427,170 B1 | * | 7/2002 | Sitaraman et al. | 709/226 |

* cited by examiner

Primary Examiner—John Breene  
Assistant Examiner—Cheryl Lewis (57) ABSTRACT

A backend data processor of a network monitoring system attempts to identify the point of presence (POP) associated with each uploaded network performance data record by comparing the POP identification information contained in each uploaded data record with the known, valid POP telephone numbers stored in a lookup phone book. A series of lookup searches are performed by comparing a certain number of the digits of the raw POP string with corresponding digits of the POP numbers stored in the lookup phone book until an exact, unique match is found. An initial "pessimistic" lookup search compares the rightmost N digits of the uploaded POP string with the rightmost N digits of each POP number in the lookup phone book for all countries. If the initial pessimistic lookup search is unsuccessful, an optimistic lookup search is conducted taking into account independent information indicating the country code and area code from which the data record originated. If the optimistic lookup search is unsuccessful, a final pessimistic lookup search is conducted by again comparing the rightmost N digits of the uploaded POP string with the rightmost N digits of each POP number in the lookup phone book for all countries, with successively smaller values of N.

22 Claims, 6 Drawing Sheets

METHOD OF SEARCHING A DATA RECORD FOR A VALID IDENTIFIER

BACKGROUND OF THE INVENTION

1. Field of the Invention

The present invention relates to a method of determining whether or not information within a character string is valid, and, more particularly, to a technique for validating that a string within a data record matches a pre-stored valid identifier to permit association of the data record with other data records having common identifiers.

2. Description of the Related Art

Both communication network service providers and their customers recognize an increasing need to accurately measure operational performance of data communications networks. Communications networks are currently utilized in various applications for transmission and reception of data between parties at different locations. A typical data transmission system includes a plurality of customers linked by one or more data packet switching networks. Ordinarily, when a party needs to send and receive data over distances, the party (customer) enters into a service contract with a service provider to provide access to a data communications network.

Depending on an individual customer's needs, the service contract may include provisions that guarantee certain minimum performance requirements that the service provider must meet. Among the performance metrics that need to be monitored to comply with such requirements may be those that reflect system performance from the perspective of the end user. For example, a service contract may specify a minimum access speed or a maximum allowable percentage of time that a user gets a busy signal when dialing into the network (e.g., a specified access attempt success/failure rate or a dial up success/failure rate). Further, if the customer expects to send and receive a particular amount of data on a regular basis, the customer may want the service provider to guarantee that a specified minimum bandwidth or throughput rate will be available to the customer at all times. The service provider may be required to ensure that the amount of time the network is unavailable to the customer is less than a specified percentage. Certain customer applications are sensitive to transmission delays and/or the loss of data within the network. Thus, the customer may want the service provider to guarantee that the average or minimum ratio of data units delivered by the network to data units offered to the network at the far-end is above a certain percentage (e.g., a maximum packet loss rate) and/or that the average or maximum transmission delays or a maximum variation in delays (jitter) will not exceed a certain duration.

From a service provider's perspective, it would be competitively advantageous to be able to demonstrate to potential and existing customers that the service provider is capable of meeting and does meet such network performance metrics. Thus, the capability to provide analysis of network system performance at the service level, particularly in the context of network systems that share bandwidth between end-points or sites, would be advantageous from both a customer and service provider standpoint.

Internet service providers (ISP), who provide Internet connectivity to many customers, are an example of service providers that may want to monitor their networks to ensure acceptable operation. In a typical configuration, an ISP provides several Points of Presence for user access. A Point of Presence (POP) is a local exchange that users dial into via a modem and which connects the users to a wide area or global communication network, such as the Internet. To connect to the network, a customer configures his computer to dial a telephone number associated with a local POP. Once the hardware at the POP answers, the POP initiates data communications with the client. The POP is coupled to the network via well-known systems that need not be described in detail herein.

Performance metrics that reflect end-user experience are of particular interest to ISPs and their customers. A network monitoring system capable of accurately assessing and determining network service perform from the perspective of an end user is described in U.S. Pat. No. 09/256,647, pending to Chu et al., the disclosure of which is incorporated herein by reference in its entirety. In the network performance monitoring system described by Chu et al., user modules within the machines of end users upload monitoring data to a data collector of a backend data processing system. Data records from several such data collectors are aggregated and organized in a backend aggregator module. The aggregator is responsible for directing data to relational databases and information reporting engines to produce information useful for assessing operation performance, system troubleshooting and system planning.

In order to generate meaningful information that can be used to analyze system performance and troubleshoot system problems, the aggregator must organize data by associating like data with like data. For example, it is more informational to group failed connections by POP rather than grouping all failed connections together. If one POP is having more login failures per attempt than other POPs, the service provider may want to focus on troubleshooting the equipment at that POP. Thus, knowing the POP associated with monitoring data from various end-users allows the database/reporting engine to group data on a POP basis, thereby allowing the service provider to glean information about performance of equipment at individual POPs.

One of the pieces of information within data records uploaded to the aggregator is the phone string dialed by the modem. This string indicates which POP or phone number the caller may have dialed. The string containing the POP may contain one or more of the following tokens: escape characters to reach an outside line (e.g. "9," from a typical US Hotel); pause characters (e.g. ","); a country code; a code to indicate calls to a foreign country (e.g. "011" in U.S.); a code to indicate calls across area codes/regions (e.g. "1" in U.S.); an area code; a local number; calling card information; ISDN information; extraneous characters; and other miscellaneous characters.

In a global environment, where the escape codes are different in different countries and the length of codes is variable, many of the tokens are optional, and many dialed numbers are incorrect, parsing a raw string of characters and deriving a corresponding POP number is a challenging exercise. The quality of this derivation process directly impacts the value of the data for the operators of the POP. It is important that as much of the valuable data possible is extracted; however, incorrectly identifying the POP number can waste considerable operational investigation resources. Some service providers' dialers guide the users in selecting a phone number from a phonebook (downloaded to users' PCs); however, most of these dialers still allow the end users to enter any number they desire.

The difficulty of correctly identifying the POP associated with end-user monitoring data is a unique problem faced by backend data processors of network monitoring systems. For example, conventional telephone switching devices deal with this problem in an easier manner, because the telephone number dialed is rigidly structured, and the switching devices have a context in which to parse the information. Secondly, if a telephone switching device does not understand the format of the dialed number (e.g. if the user mis-dialed), the switching device can reject the number with an appropriate error message that then forces the user to dial a number that the switching device can parse. In a backend data aggregating system, there is no standard context in which to parse the data string containing the POP (e.g., the kind of logic used in a hotel private branch exchange (PBX) does not exist).

Conventional switching devices inherently ensure accurate string parsing in the course of connecting users that provide valid, parsable information and simply reject any unparsable information at the time of transmission by failing to connect the user. In contrast, a backend data processor of a network monitoring system possesses no inherent mechanism to force the user to pass the system something that the system can understand, since all the processing is done post-facto. Further, to monitor end-user experience and to provide useful information for troubleshooting, it is preferable to collect monitoring data on both valid and invalid information (e.g., the reason that a particular user has a low connection rate may result from the user repeatedly entering an invalid POP number rather than from a problem with the POP itself). Thus, the backend data processing system may be required to process valid number formats that can actually be parsed by intermediate devices, as well as invalid formats that cannot be parsed.

In the system disclosed in the aforementioned Chu et al. patent application, a basic parsing technique is described in which the POP number is extracted by stripping off all other characters in the uploaded string containing the POP number and essentially assuming that the remaining digits represent the POP. Specifically, the aggregator uses a pattern-matching algorithm to "clean" the raw POP number. This algorithm maintains a list of known patterns for prefixes, access codes, credit card numbers, and individual country's dialing patterns. While this approach is generally successful in identifying the correct POP number, it is only as accurate as the pattern knowledge base is comprehensive. In practice, the technique fails to correctly identify valid POP numbers of a significant percentage of data records uploaded to the aggregator. Consequently, some of the monitoring data is not successfully associated and aggregated with other data from the same POP, thereby reducing the overall accuracy and value of the information contained in the resulting performance reports.

Information other than the POP string may be available to identify the POP associated with a data record uploaded to a backend data processor. For example, the data record may contain user-configured information stored in the end-users computer identifying the user's country, area code, service provider, etc. However, in many instances the configuration information on the user's computer is incorrect, making reliance on this information problematic. This may be so despite the fact that the computer has successfully connected to the network. A typical example is a person traveling on business with a portable computer (e.g., a laptop). Within the computer, the area code and country code are typically configured to reflect the location in which the person lives. As the person travels from city to city and country to country and connects to networks in various locations, he may not change the client configuration to match his geographic location. If the person dials an appropriate local number at a given location to connect to a network, the call attempt may succeed even though the user-configured area code and/or country code information stored in the computer is wrong (this is because a correct local number appropriate to the location was supplied, and the user-configured information is not used to make the call/connection itself).

User-configured country and area code information is also commonly incorrect where the user attempts to connect to a network by dialing a number in a different area code or in another country. Again, the call attempt may succeed in connecting the user to the network even though the user's computer had the incorrect configuration information. Likewise, if the area code for a particular location changes, user's may or may not update their computer configuration to match the new area code. Network connection call attempts may continue to succeed if the calls are made using only the local number (which is presently still permitted in some area codes in the U.S.). In any of the foregoing instances, if a backend database/reporting engine of a network monitoring system were to assume that user-configured information regarding area code and country code was accurate, the system may identify a nonexistent or invalid POP number, thereby prevent data records from such users to be properly aggregated with those from users connecting to the network via the same POP.

Accordingly, there remains a need in network monitoring systems for an improved technique for determining the identity of POPs associated with data records uploaded by end users to a backend processing system of a network monitoring system before using the POP number to associate and aggregate network monitoring data and generating performance information on a POP basis.

SUMMARY OF THE INVENTION

Therefore, in light of the above, and for other reasons that become apparent when the invention is fully described, an object of the present invention is to generate more useful network monitoring information and reports by improving the accuracy of methods for associating data records having common attributes, such as a common point of presence (POP), thereby permitting more accurate and meaningful association and aggregation of network monitoring data.

A further object of the present invention is to provide a more reliable and accurate method of determining the identities of POPs to which data records containing network monitoring data correspond.

Yet a further object of the present invention is to validate that POP identification information contained within a data record matches a known valid POP number.

A still further object of the present invention is to account for a variety of different POP number formats in a convenient manner when attempting to compare and match POP identification information contained within a data record to known valid POP numbers.

Another object of the present invention is to employ multiple search strategies to increase the likelihood of positively matching POP identification information contained within a data record to one of a number of pre-stored valid POP numbers.

Yet another object of the present invention is to use independently obtained auxiliary information within a POP search process to improve the likelihood of correctly matching POP identification information contained within a data record to a known valid POP number.

The aforesaid objects are achieved individually and in combination, and it is not intended that the present invention be construed as requiring two or more of the objects to be combined unless expressly required by the claims attached hereto.

In accordance with the present invention, in order to more reliably determine the identity of the POP to which data records containing network monitoring data correspond, a backend data processor of a network monitoring system employs a lookup "phone-book" of known valid POP numbers to determine whether or not the POP identification information contained in the uploaded record matches one of the pre-stored valid POP numbers. Each POP can be uniquely identified by the telephone number (area code and local number) used to connect to the POP (i.e., its "POP number"). The POP identification technique of the present invention attempts to positively identify the POP associated with each network monitoring data record uploaded to the backend data processing system by comparing the POP number contained in the data record with the pre-stored POP numbers stored in the lookup phone book.

More specifically, one of the data fields within each uploaded data record contains the phone string dialed by the end-user's modem. As least some of the extraneous characters in the modem-dialed string, such as non-digit characters and characters before commas and after ampersands, are stripped off in order to extract a raw POP string from the modem-dialed string. A series of different lookup searches are then performed by comparing a certain number of the digits of the raw POP string with corresponding digits of the POP numbers stored in the lookup phone book until an exact, unique match is found.

An initial "pessimistic" lookup search compares the last or rightmost N digits of the raw POP string with the rightmost N digits of each POP number in the lookup phone book for all countries. The search is first performed with the rightmost nine digits and, if unsuccessful in finding an exact, unique match, the search is repeated with the rightmost eight digits. The approach taken in the initial pessimistic lookup search avoids the need to take into consideration the various different POP telephone number formats (e.g., different length area codes and local numbers) that exist throughout the world and, consequently, the different POP telephone number formats of the POP numbers contained in the lookup phone book.

If the initial pessimistic lookup search is unsuccessful in finding a unique match between the raw POP string and any of the POP numbers in the lookup phone book, a three-stage "optimistic" lookup search is conducted in which independent information indicating the user's country code and area code (e.g., user-configured information uploaded in the data record along with the raw POP string) is relied upon to match a portion of the raw POP string to a POP number in the lookup phone book. Specifically each uploaded data record contains data fields, other than the field containing the modem-dialed string, that indicate the user's country code and area code. The optimistic lookup search is limited to pre-stored POP numbers of the country indicated by the user's country code. The length of the raw POP string is determined by the POP rules of the user's country. For example, in the U.S., the POP rule requires a three-digit area code (AC=3) and seven-digit local number (LN=7), resulting in a ten-digit POP number. Other countries may have multiple, different POP rules. For each POP rule in the user's country, the rightmost AC+LN digits of the raw POP string are selected and compared with the rightmost AC+LN digits of the POP numbers in the lookup phone book corresponding to the user's country. If this first stage fails to produce an exact, unique match, a second-stage lookup search is conducted by concatenating the user's area code with the rightmost LN digits of the raw POP string (i.e., the portion of the raw POP string that represents the local number), and the concatenated digits are compared with the rightmost AC+LN digits of the POP numbers in the lookup phone book corresponding to the user's country. If the second-stage is also unsuccessful in finding a match, a third stage lookup search is undertaken in which only the local number digits of the raw POP string and pre-stored POP numbers are compared to find a unique match. If multiple matches are found and they all correspond to the same service provider, the POP of the data record is identified only by the matching local number.

If the optimistic lookup search is unsuccessful in finding a match between the raw POP string and any of the POP numbers in the lookup phone book of the user's country, a final "pessimistic" lookup search is conducted by again comparing the last (rightmost) N digits of the raw POP string with the rightmost N digits of each POP number in the lookup phone book for all countries. In this case, the search begins with the rightmost nine digits and is repeated with successively fewer digits down to six, until an exact, unique match is found or multiple matches are found in the same country with the same service provider. If any of the pessimistic and optimistic lookup search finds an exact, unique match, it is determined that the data record corresponds to POP identified by the valid POP number in the lookup phone book whose digits matched those of the raw POP string. If the final pessimistic lookup search finds two or more matches between the rightmost N digits of the raw POP string and POP numbers in the lookup phone book that are in the same country and with the same service provider, the POP is, in effect, only partially identified, and the POP of the data record is "identified" by only the N matching digits rather than by a complete, valid POP number. If the final pessimistic lookup search fails to identify a match, the raw POP string is declared unparable. Optionally, a conventional parsing algorithm can subsequently be applied to the modem-dialed string to attempt to extract a valid POP number.

The system of the present invention determines the identity of POPs to which data records containing network monitoring data correspond more reliably than the aforementioned conventional parsing algorithms, resulting in a higher percentage of data records being associated and aggregated with data records corresponding to the same POP. This, in turn, makes the network monitoring reports generated from the network monitoring data more meaningful and more useful in troubleshooting network problems, planning future network resources and demonstrating compliance with service agreements.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
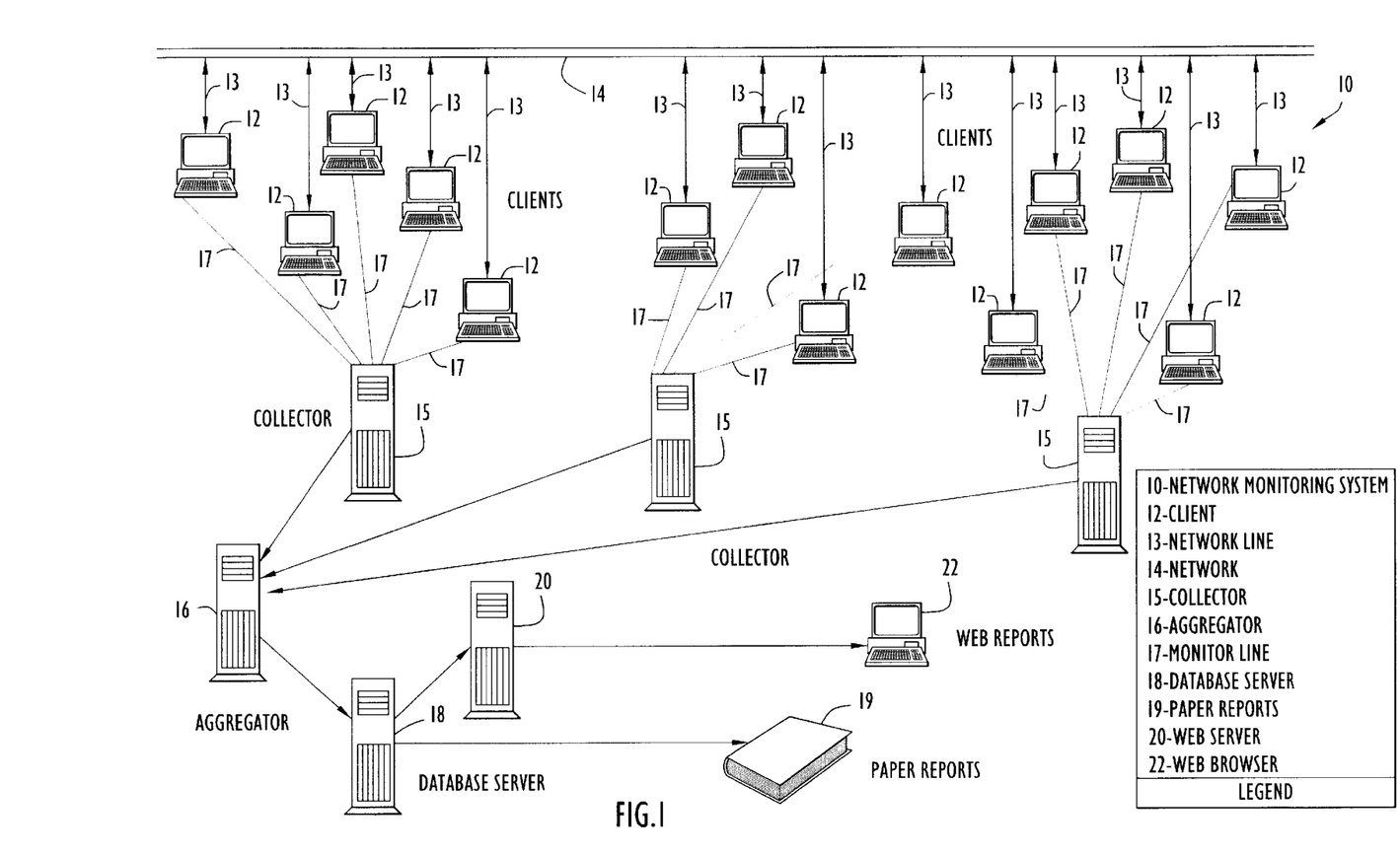
FIG. 1 is a top-level system diagram of a data communications network and a network monitoring system according to an exemplary embodiment of the present invention.

The following detailed explanations of FIGS. 1–6 and of the preferred embodiments reveal the methods and apparatus of the present invention. FIG. 1 illustrates a typical configuration of an exemplary network monitoring system 10 in which a preferred embodiment of the technique of the present invention can be used. A brief overview of this network monitoring system provides a context for better understanding the novel features of the present invention. In system 10, a number of end users or "clients" 12 are monitored for network performance at the client end. Clients 12 are coupled via traffic lines 13 to a client-server network 14 that provides connection services to clients 12. There are many such client-server networks that system 10 can monitor. One common type of client-server network currently in use that is in need of monitoring is an Internet Service Provider (ISP) network. In such a network, clients 12 connect to the ISP, via network 14 through lines 13. Different clients might connect to network 14 differently, but each client can still be monitored to determine the end user experience with respect to network 14. The end user experience that is monitored is generally objective data that models, or can be used to determine, how an end user might perceive the network performance. For example, if objective data indicates that a first client gets a busy signal 40% of the time a dial-up line to a service is initiated and a second client gets a busy signal 5% of the time a dial-up line to that service is initiated, it can be inferred that an end user using the first client will probably be less satisfied with the service than an end user using the second client, all other factors being equal.

Each client 12 includes a user module for collecting data about the client's configuration and objective data representing the end user experience at that client. Each of the user modules communicates with a collector 15 over a monitor line 17. Collectors 15 form part of an experience test server that runs the tests of the end-user experience. Monitor lines 17 are shown separated from traffic lines 13, although in some embodiments, the functions of traffic lines 13 and monitor lines 17 are carried by the same physical infrastructure. For example, in one embodiment of an ISP monitoring system, client 12 is connected to network 14 through a TCP/IP (Transport Control Protocol/Internet Protocol, a very common protocol on the global internetwork of networks known as the "Internet") link that carries both traffic packets (line 13) and monitoring packets (line 17). By contrast, other embodiments might have lines 13 and lines 17 using separate physical infrastructures, such as a local area network for traffic lines 13 and a dial-up connection for monitor lines 17. Therefore, it should be understood that by showing the lines separately, the functions of the separate communications are more easily illustrated and their separation is not intended to imply that the lines must be separate.

Clients 12 can be any type of computer, computing device or communication device that connects to a network or server system, be it a local area network (LAN), wide area network (WAN), the Internet, a dial-up online system or a direct connect private online system. For example, some of clients 12 can be desktop computers running a Windows-based operating system, while other clients 12 might be computers running a Unix-based operating system provided by any of a number of different vendors.

Collectors 15 collect user experience data over monitor lines 17. While one data point from one client 12 might not be representative of the objective end user performance of network 14, when data points are collected from a great many clients, the aggregate data is often very accurate at representing the objective end user experience, especially when the data is aggregated accurately, i.e., aggregated data points are aggregated effectively when they represent data from similar clients and are aggregated ineffectively when they represent data from dissimilar clients.

Collectors 15 are located for easy data collection, preferably in a way that does not affect network performance enough to skew the collected data. For example, with an ISP network where many points of presence (POPs) are provided for dial-up connections, a collector 15 might be provided at each POP. Alternatively, collectors 15 might be located at specified network addresses and operate independently from the ISP providing service.

Collectors 15 collect performance data from the user modules and provide the collected data to an aggregator 16. In the preferred embodiment, the performance data is normalized and "cleaned" to allow for more accurate aggregation. The cleaning can be done at the aggregator 16 or at the collectors 15, or even at the individual user modules. Aggregator 16 provides the aggregated and cleaned data to a database server 18, from where paper reports 19 can be generated. Data from database server 18 can also be provided to a web server 20 for presentation of on-line performance reports. In one embodiment, where the database is provided on web server 20, a potential customer interested in a particular ISP's performance, or the quality control personnel of the ISP, can check the online performance using an ordinary browser 22.

The data collected by the user module represents objective measurement of user's access attempts and network performance. That data might include user experiences since the last successful connection, including failed attempts, error codes, connection speeds, and redial events, combined with key profile information such as time-of-day, POP number, Virtual Private Network (VPN) identifier, and modem type. The profile information allows the performance data to be aggregated in an informational manner. For example, it is more informational to group failed connections by POP rather than grouping all failed connections together.

The end user experience data is dynamically processed and aggregated with other users' experiences and stored in a relational database, as might be located on database server 18. The information in the database is organized into multiple aggregate tables to support many different combinations of selection criteria; however, in order to glean useful information from the data, the data may require further processing and refinement so that like data can be aggregated with like data.

Figure 2:
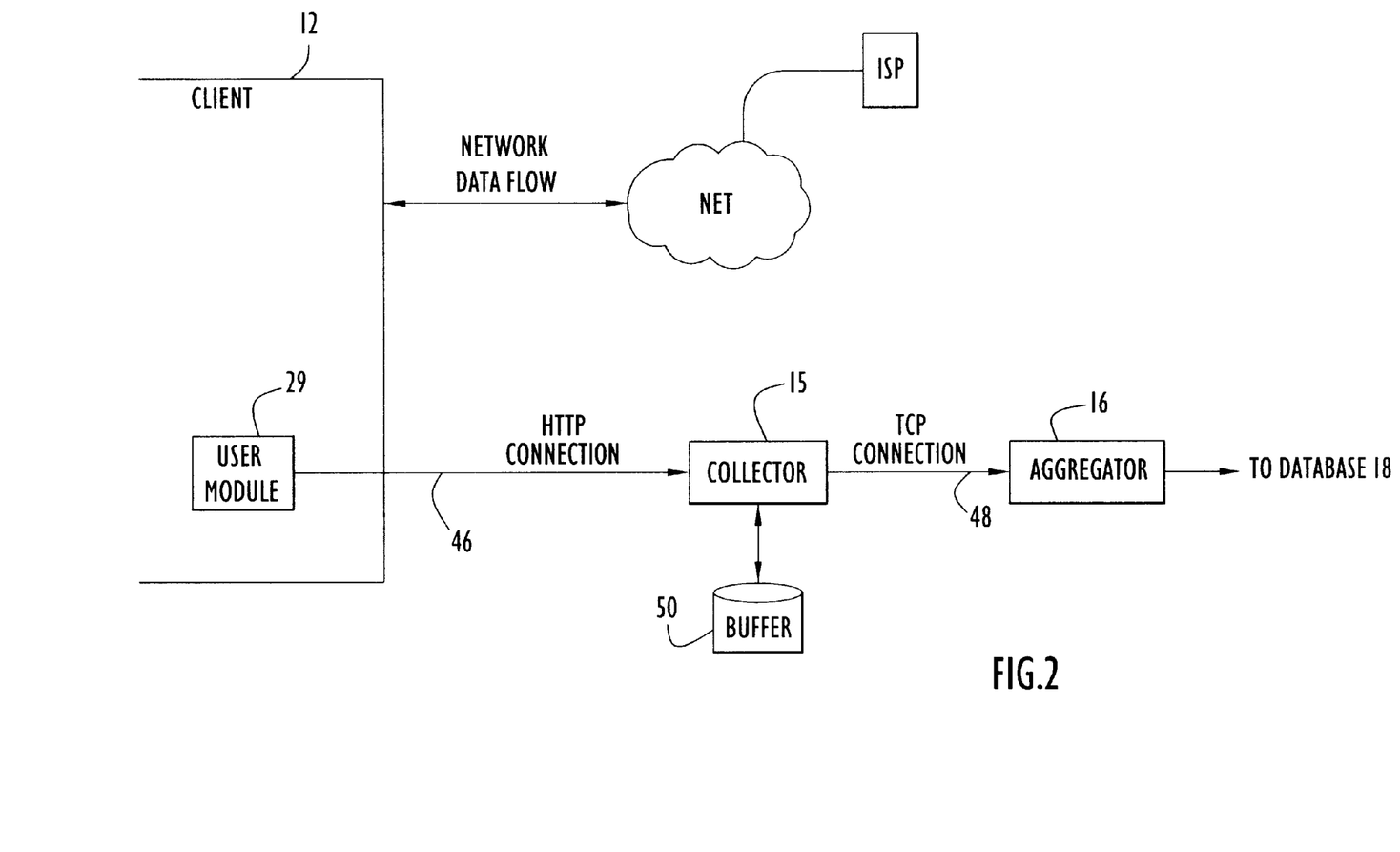
FIG. 2 is a schematic diagram showing data flows between a user module, a data collector and a data aggregator according to an exemplary embodiment of the present invention.

FIG. 2 shows in detail the path that data takes from a user module 29 to aggregator 16. The collection of data is preferably done in substantially real-time, so that service providers can spot problems as they are happening at end user clients 12. The network monitoring system is designed such that, when the network between collector 15 and aggregator 16 is operating correctly (i.e. no WAN outages), data should take no more than one minute from initial reception by a collector to insertion in the database at server 18. This is ensured by streaming the data in near real time from the clients to the database. In the case of WAN outages, data at a collector 15 is buffered in a buffer 50 at that collector until WAN connectivity has been reestablished. Preferably, buffer 50 is large enough to buffer data for a few days in the event of loss of master collector contact.

Data from clients 12 to a collector 15 is uploaded over line 46, which is preferably a HTTP connection, to take advantage of HTTP tools already available. Of course, other protocols might be used where needed. HTTP is currently preferred because it allows data packets to get through typically configured firewalls. Data can be uploaded securely (using commonly available public-private key encryption mechanisms) or insecurely (based on a configuration or version of the client software). The security mechanisms allow for authentication of correct senders and receivers, and prevent packet contents from being easily decoded as they travel through the Internet.

An example of a performance data record structure that a user module 29 can use to convey information to a collector is shown in Table 1.

TABLE 1

| Attribute Column | Description | Example |
| --- | --- | --- |
| ProtocolVer | InSight data version | 3 |
| OS | Operation system platform/version | "Win 95 4.0.1212 b" |
| OEM1 | OEM 1 | "ISP Name" |
| ProductVer | InSight version | "3.10" |
| RawProvider | ISP/DUN name uploaded | "ISP Name" |
| RawPOP | POP number uploaded | "555-1212" |
| RawCountry | Originating country code uploaded | "1" |
| RawCity/Area | Originating city/area code uploaded | "609" |
| RawModem | Modem name uploaded | "Standard 28800" |
| PPPServerIP | PPP Server IP | "207.240.85.52" |
| RawRasUserName | RasUserName uploaded | "MyAccount" |
| PSTTime | Date/time in PST timezone | "03/15/1998 15:56:06" |
| LocalTime | Date/time in local timezone | "03/15/1998 15:56:06" |
| ResultCode | Result code | 0 |
| ElapsedTimeMs | Milliseconds from start of call/test to result code | 31147 |
| InitConnectSpeed | Initial modem connection speed | 28800 |
| IsRedial | Whether this is a redial attempt | 0 |

It will be understood that the data record shown in Table 1 is provided by way of example only and is not intended to be limiting in any way on the scope of the invention. In general, any data record format suitable for conveying network monitoring data, user configuration data and identification information such as country, area code, POP number, service provider, etc. falls within the scope of the invention.

The data records collected at collectors 15 are forwarded to aggregator 16, following any data cleansing, over connection 48. Connection 48 can be, for example, a persistent TCP connection. If performance is less of a concern, a non-persistent connection can be used. The data transfer can be done securely or non-securely.

The data collected from the user modules, by its very nature, is not in an ideally normalized form. For example, one user module might be reporting connection data relating to a POP number of *70,555-1234 while another user module might report for a POP number of 555-1234. Recognizing that the prefix "*70" is the "turn call waiting off" code, it is immediately apparent that these two user modules are reporting data with respect to the same POP. In order to correlate and aggregate the data at database server 18 informatively, these similarities need to be detected.

In accordance with the present invention, in order to more reliably determine the identity of the POP connecting an end-user who has uploaded monitoring information to the aggregator, the aggregator employs a customer supplied "phone book" with information about the exact number used by the customers for their POPs. More specifically, each POP can be uniquely identified by the telephone number (area code and local number) used to connect to the POP (i.e., its "POP number"). The POP identification technique of the present invention attempts to identify the POP associated with each record of monitoring data sent to the aggregator by comparing a raw POP string contained in each uploaded data record with preloaded POP numbers stored in the lookup phone book. As described in greater detailed hereinbelow, the lookup phone book is essentially a list or table of pre-stored POP telephone numbers that are known to be valid. The lookup phone book can be organized by identifiers such as country code, service provider, equipment manufacturer, etc. The preloaded POP numbers are supplied by the service providers, and the lookup phone book of POP numbers is continually maintained (e.g., on a weekly or monthly basis) to reflect added, deleted and modified POP numbers within the service providers' systems.

The present invention involves comparing a portion (i.e., a certain number of digits) of the raw POP string with the POP numbers stored in the lookup phone book until an exact, unique match is found. The method includes an initial "pessimistic" lookup search in which comparisons are made between the last (rightmost) N digits of the raw POP string and the rightmost N digits of each POP number in the lookup phone book. The initial pessimistic lookup search involves comparing the digits of the raw POP string with all POP numbers in lookup phone book for all countries. If a unique match is found by the initial pessimistic lookup search, the identity of the POP is determined to be the matching POP number in the lookup phone book. Character strings or numbers are conventionally presented as a sequence or digits extending from left (most significant digit) to right (least significant digit). As used herein, the term "last" or "rightmost" refers to the sequence of characters or digits that appear last or on the right-hand side when a string of digits or characters are presented in this manner. For example, in a ten-digit telephone number with a three digit area code followed by a seven digit local number, e.g., (800) 555-1212, the last or rightmost seven digits contain the local number, i.e., 5551212.

If the initial pessimistic lookup search fails to find a unique match between the raw POP string and any of the POP numbers in the lookup phone book, an "optimistic" lookup search is conducted in which independent information indicating the user's country code and area code (e.g., user configuration information uploaded along with the raw POP string) is relied upon to match a portion of the raw POP string to a POP number in the lookup phone book. The optimistic lookup search attempts to match the raw POP string to POP numbers in the lookup phone book that correspond to the calling country indicated by the user's country code contained in the user-configured information.

If a unique match is found by the optimistic lookup search, the identity of the POP is determined to be the matching POP number in the lookup phone book. If the optimistic lookup search fails to find a unique match between the raw POP string and any of the POP numbers in the lookup phone book, the independent country code and area code information is distrusted, and a final "pessimistic" lookup search is conducted in which comparisons are made between the last N digits of the raw POP string and the last N digits of each POP number in the lookup phone book for all countries. In the final "pessimistic" lookup search, the number of compared digits N is successively decremented down to a minimum value until a unique match is found or multiple matches are found. In the case of multiple matches, the POP is identified by the matching portion of the POP string in the lookup phone book, resulting in an incomplete or partial identification of the POP string. A more detailed explanation of an exemplary embodiment of the POP lookup method of the present invention follows.

As seen in the example shown in Table 1, the aggregator receives several pieces of information with each call record uploaded from an end user machine. One piece of information contained in this set of data is the actual telephone number/string dialed by the user's modem. This string may contain a calling card number prefix, a dialing prefix, or other optional dialing digits or characters. By way of example, the modem-dialed string containing the POP number may contain one or more of following tokens: escape characters to reach an outside line (e.g. "9," from a typical U.S. Hotel); pause characters (e.g. ","); a country code; a code to indicate calls to a foreign country (e.g. "011" in U.S.); a code to indicate calls across area codes/regions (e.g. "1" in U.S.); a call waiting cancel code; a caller ID blocking code; an area code; a local number; calling card information; ISDN information; extraneous characters; and other miscellaneous characters.

Again, POPs are identified by their telephone numbers, including the area code and local number. Contained within the character string dialed by the telephone modem is a sequence of numeric digits representing the telephone number of the POP to which the user is connected or, alternatively, an invalid POP number to which the user attempted unsuccessfully to connect (such information can be uploaded to the aggregator subsequent to the failed attempted, once the end user successfully connects to the network by dialing a valid POP number). Thus, the POP string is essentially a data segment (i.e., a sequence of alphanumeric characters, symbols or numeric digits) embedded within a particular data field of the data record along with other data. As used herein and in the claims, the term "string" refers to a sequence of symbols that represent data or information, and the term "digit" refers to a single one of the symbols in such a sequence or the position of a particular symbol within the sequence. Although, in the context of a modem-dialed string, the string includes alphanumeric characters and possibly punctuation and other keyboard symbols, and the POP number comprises decimal-based numbers (i.e., base-ten numbers), more generally, a "string" as used herein and in the claims can be a sequence of any kind of information symbols (e.g., binary numbers). Likewise, a "data segment" can be any portion of (or all of) such a string.

Figure 3:
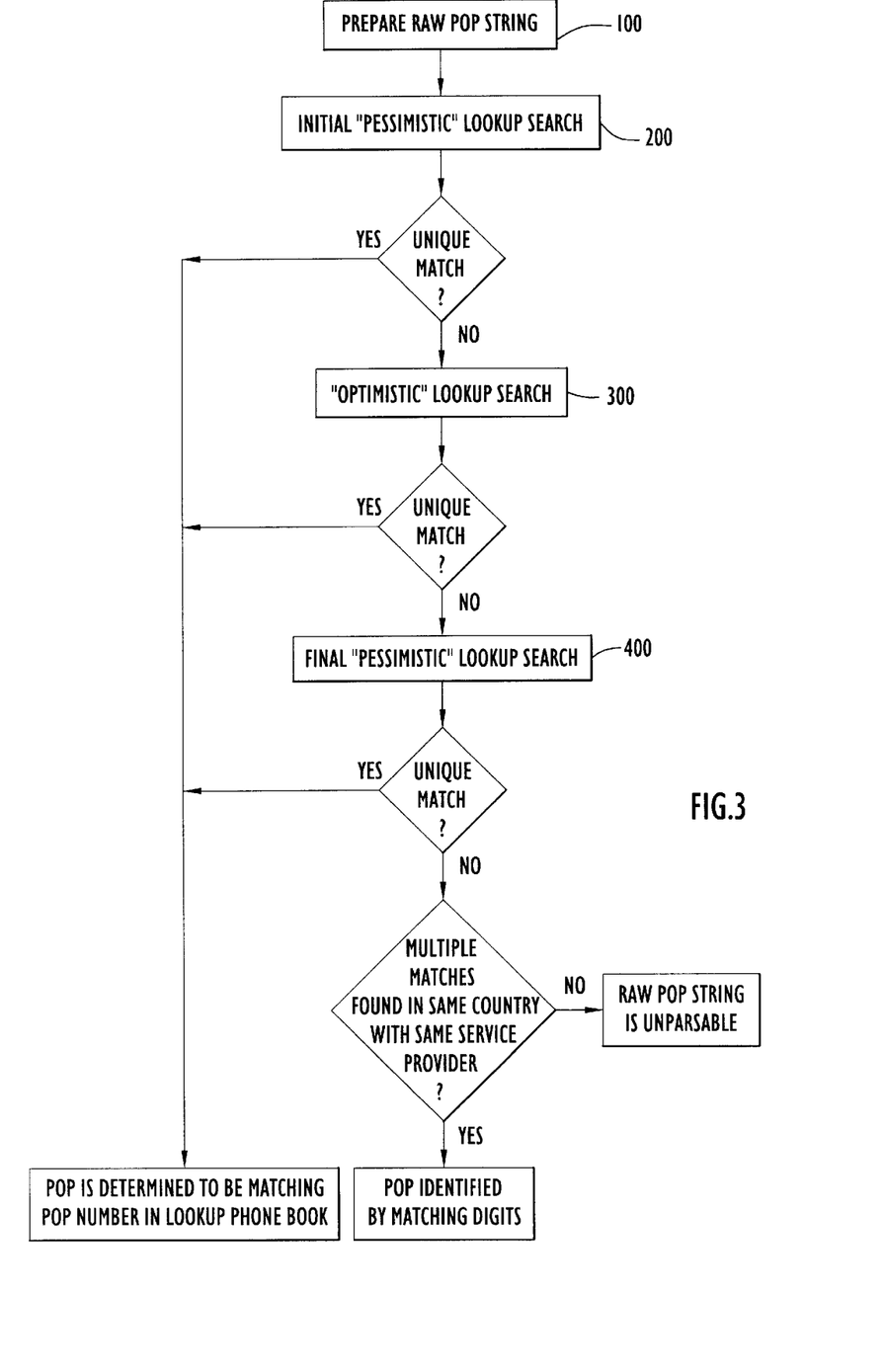
FIG. 3 is a top level functional flow diagram illustrating the sequence of lookup searches performed in accordance with an exemplary embodiment of the present invention to determine whether or not POP identification information within an uploaded data record matches a pre-stored valid POP number.

The present invention attempts to extract from the telephone modem string the identity of the POP corresponding to the monitoring data uploaded from the end user client. A top level flow diagram of the method of present invention is shown in FIG. 3. In accordance with a first step 100, the aggregator reduces the telephone modem string to a raw POP string by stripping out certain characters known not to be part of the POP string. For example, any commas (,) and characters preceding a comma (,), any ampersands (&) and characters following an ampersand, and any non-digit (i.e., non-numeric) characters are stripped from the telephone modem string to yield the raw POP string. Note that the stripping process employed in the present invention need not be as exhaustive as that used in an algorithm that attempts to remove all characters that are not part of the POP identifier (i.e., all but the area code and local number). According to the present invention, characters other than those corresponding to the POP number can remain in the raw POP string provided the rightmost digits of the raw POP string are those corresponding to the POP telephone number, or a specific digit or character position can be identified at the rightmost digit of the POP phone number, effectively making that digit the rightmost digit of the raw POP string.

After preparing the raw POP string in step 100, the initial "pessimistic" lookup search is performed in step 200. As shown in greater detail in FIG. 4, the rightmost N digits of the raw POP string are selected (step 210). The integer N represents a string length defining the number of digits of the raw POP string to be compared with pre-stored valid POP numbers in the lookup phone book. By way of non-limiting example, the value of N can be initially set to nine (9).

Figure 4:
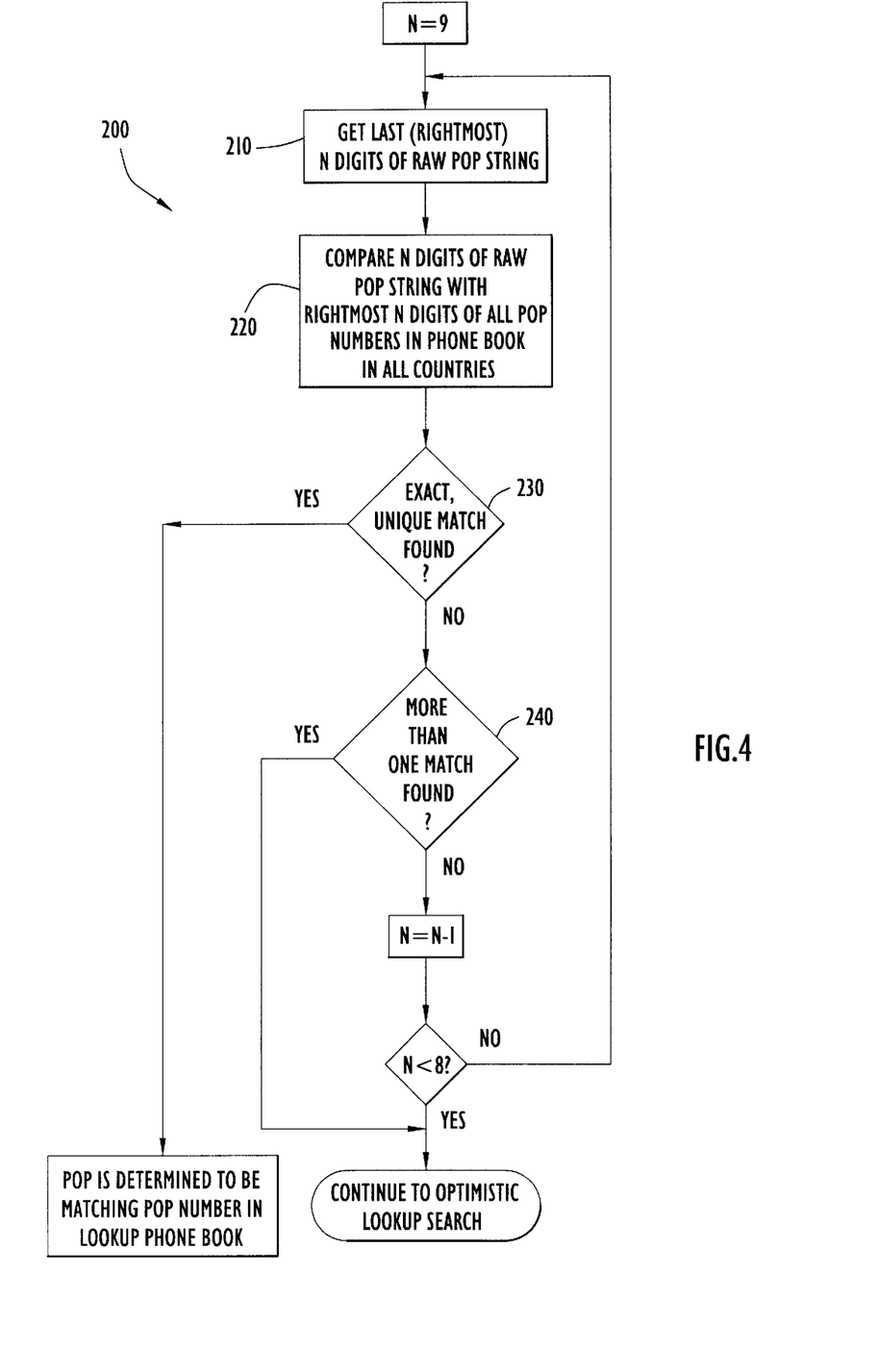
FIG. 4 is a functional flow diagram illustrating the processing steps of the initial pessimistic lookup search performed in accordance with the present invention.

The lookup phone book contains a list of all valid POP phone numbers for the customer grouped by service provider, country, and area code. The phone book is essentially a database that is populated either manually or in an automated manner from the directory that a service provider maintains regarding its POPs. When this data is imported into the network monitoring system, it can be used as a "matching" table to give more accurate recognition of the user-supplied dialed string than the aforementioned conventional parsing algorithm. Table 2 provides examples of the type of information that may be contained in the lookup phone book.

TABLE 2

| OEM | ISP | Country Code | Area Code | Local Number | POP | Description |
|---|---|---|---|---|---|---|
| OEM1 | ISP1 | 1 | 800 | 5551212 | 800-555-1212 | toll free |
| OEM2 | ISP2 | 1 | 963 | 1234567 | 963-123-4567 | |
| OEM3 | ISP3 | 49 | 0355 | 4968485 | 0355-496-8485 | |
| OEM4 | ISP4 | 49 | 0368 | 6464800 | 0368-646-4800 | |

The N digits of the raw POP string are compared with the rightmost N digits of each of the POP numbers contained in the lookup phone book for every country (step 220). If an exact, unique match is found between the N digits of the raw POP string and one of the POP numbers in the lookup phone book, then it is determined in step 230 that the raw POP string contains a valid POP number, namely the valid POP number whose rightmost digits matched those of the raw POP string. If an exact, unique match is not found, then processing continues to step 240. If the rightmost N digits of the raw POP string produce an exact match with the N rightmost digits of more than one of the POP numbers in the lookup phone book, then it is decided in step 240 to terminate the initial pessimistic lookup search without a match, and the optimistic lookup search is initiated.

If, on the other hand, no matches are found between the rightmost N digits of the raw POP string and the rightmost N digits of any of the POP numbers in the lookup phone book for all countries, the value of N is decremented to eight (8), and the process is repeated, as shown in FIG. 4, by comparing the rightmost eight digits of the raw POP string with the rightmost eight digits of each of the POP numbers contained in the lookup phone book for every country. If an exact, unique match is found between the rightmost eight digits of the raw POP string and the rightmost eight digits of one of the POP numbers in the lookup phone book, then it is determined that the raw POP string contains a valid POP number, namely the valid POP number whose rightmost digits matched those of the raw POP string. If the rightmost eight digits of the raw POP string produce an exact match with the rightmost eight digits of more than one of the POP numbers in the lookup phone book, the initial pessimistic lookup search is terminated without declaring a match, and the optimistic lookup search is initiated. If no match is found between the rightmost eight digits of the raw POP string and rightmost eight digits of any of the POP numbers in the lookup phone book, the initial pessimistic lookup search is terminated without declaring a match, and the optimistic lookup search is initiated.

It will be understood from the foregoing that each comparison performed in the pessimistic lookup search does not necessarily involve comparing the entire raw POP string with the entire stored POP number. For example, in the U.S., a complete POP number, including area code and local number, consists of ten digits. Consequently, comparing the rightmost eight or nine digits of the raw POP string excludes from the comparison the leftmost digit(s) of U.S. POP numbers that include the area code. Nevertheless, the approach taken by the initial pessimistic lookup search allows the raw POP string to be easily compared with all POP numbers from every country without regard to the various different formats of the POP numbers throughout the world, while still providing a high likelihood of successfully finding a unique match. Moreover, the method does not rely on any supplemental information, such as knowledge of the calling country or area code; consequently, the initial pessimistic lookup search cannot be corrupted by inaccurate supplemental information. Thus, the initial pessimistic lookup search relies on a minimum amount of information to conduct a very broad search.

While described herein as involving the rightmost nine and eight digits, it will be understood that the initial pessimistic lookup search can involve comparing any suitable number of rightmost digits (e.g.: 10, 9 and 8; 9, 8 and 7; etc.), and the present invention is not limited to the exemplary embodiment involving searches with only the rightmost nine and eight digits. However, use of nine and eight digits in the initial pessimistic lookup search has been found to be well suited for efficient searching given the present length and format of POP numbers throughout the world, and provides a very low probability of matching the raw POP string with the wrong valid POP number. Further, if the wrong portion of the modem-dialed string is assumed to be the raw POP string (e.g., a sequence corresponding to a credit card number), there is very little chance that a random match will occur between any of the pre-stored POP numbers and the eight or nine errant digits of the modem-dialed string. Thus, the initial pessimistic lookup search is a "strict" search in the sense that comparisons involving only a fairly large number of digits (e.g., eight or nine) are attempted and only an unique, exact match is considered positive identification of the POP number.

Referring again to FIG. 3, if the initial pessimistic lookup search fails to identify a unique match between the rightmost N digits of the raw POP string and rightmost N digits of any of the POP numbers in the lookup phone book or finds plural matches, an "optimistic" lookup search is performed (step 300). Unlike the initial pessimistic lookup search, the optimistic lookup search is an information-assisted search in that relies on information about the data record, in addition to the raw POP string, to refine and narrow the search for a matching valid POP number in the lookup phone book. Specifically, the optimistic lookup search attempts to rely on supplemental information that reveals the calling end-user's country indicating from where the uploaded data record originated and, if necessary, the area code and service provider corresponding to the data record.

One of the primary difficulties with international phone numbers is that the area codes and local numbers are variable length. To address this problem in the context of the present invention, a list of country codes, number of digits of local numbers, and number of digits of area codes is maintained in a configuration database. The list forms a set of "POP rules" which indicate, for each POP number format in each country, the number of digits of the area code and the number of digits of the local number. These POP rules are employed in the optimistic lookup search where the user-configured country code is used to find a match between the raw POP string and a POP number in the lookup phone book. By way of non-limiting example, a POP rules list is shown in Table 3. Note that certain countries, e.g. Germany, may have more than one POP rule (i.e., different POP numbers may have different length area codes and local numbers).

TABLE 3

| Country Code | # digits local number | # digits area code |
|---|---|---|
| 1 (US) | 7 | 3 |
| 49 (Germany) | 7 | 4 |
| 49 (Germany) | 7 | 3 |
| 49 (Germany) | 7 | 2 |
| 49 (Germany) | 6 | 3 |
| 49 (Germany) | 6 | 2 |

Figure 5:
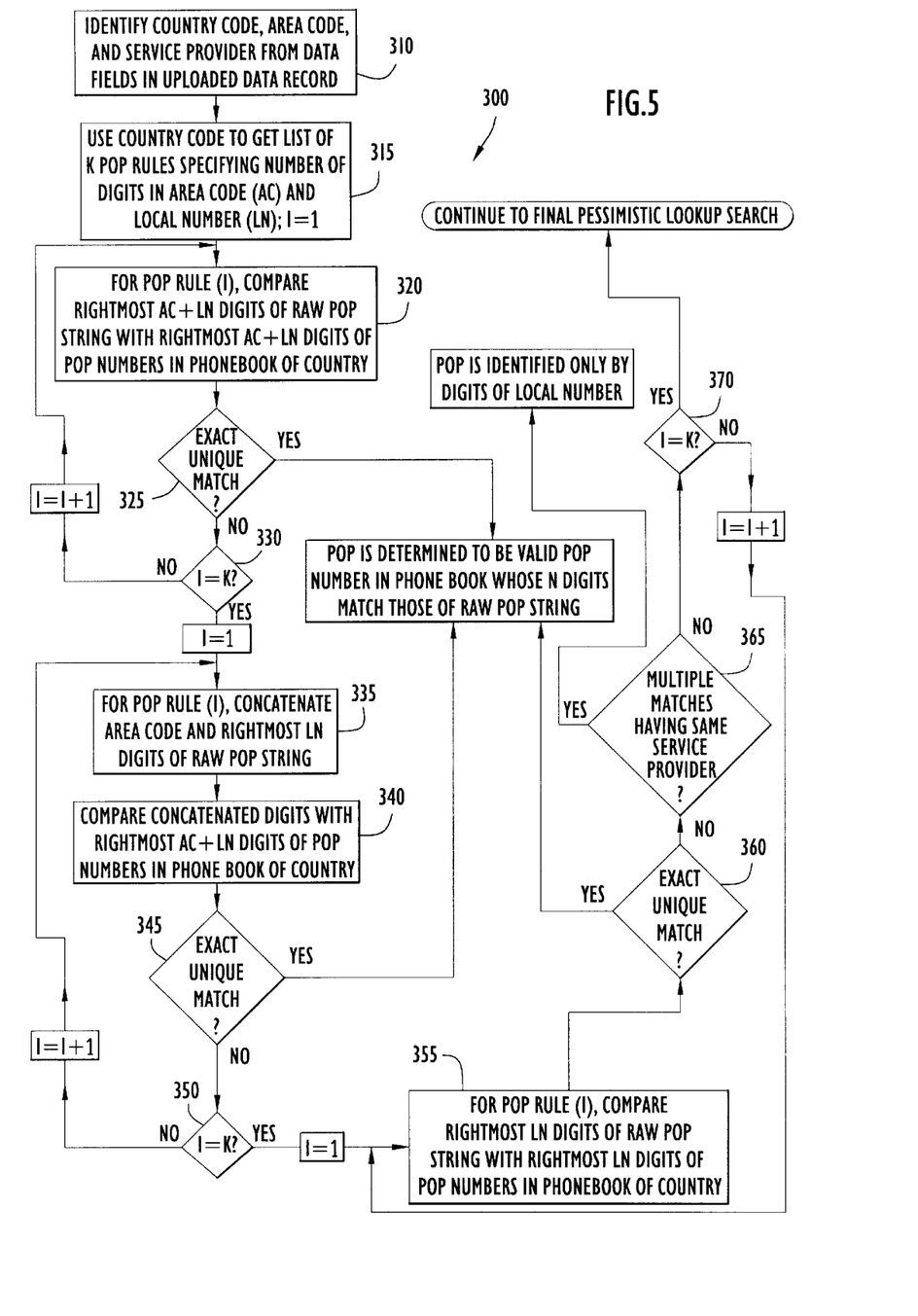
FIG. 5 is a functional flow diagram illustrating the processing steps of the optimistic lookup search performed in accordance with the present invention.

Referring to FIG. 5, a detailed flow diagram illustrating the steps of the optimistic lookup search is shown. In a first step 310, a country code, an area code and a service provider identifier corresponding to the uploaded data record are identified. As can be seen from the example shown in Table 1, the data record may contain date fields, separate from the data field containing the raw POP number, that contain the country code, the area code and the service provider identifier of the data record. The country code, area code and service provider identifier are typically user-configured parameters preset in the end-user's machine and automatically inserted into the uploaded record. Because this user-configured information is not actually used to make the connection to the network, there exists some possibility that this information is inaccurate or outdated. In general, the country code, area code and service provider information used in the optimistic lookup search can be derived from any suitable source and conveyed to the aggregator in any convenient manner, so long as this information is essentially independent of or at least distinct from the raw POP string itself.

Referring again to FIG. 5, in accordance with a first stage of the optimistic lookup search, the country code information is used to obtain a list of K different POP rules for that country, which specify the number of digits in the area code (AC) and the number of digits in the local number (LN), where K is a positive integer (step 315). The POP rule is used to determine the length of the raw POP string that will be compared with the valid POP numbers stored in the lookup phone book. Beginning with the first POP rule in the retrieved list (represented in FIG. 5 as POP rule(I), where I=1), the rightmost AC+LN digits of the raw POP string are selected and compared with the rightmost AC+LN digits of each of the POP numbers in the lookup phone book for the country indicated by the country code (step 320). For example, in the U.S., the lone POP rule (K=1) requires a three-digit area code (AC=3) and seven-digit local number (LN=7), resulting in comparisons between the rightmost ten digits of the raw POP string and the rightmost ten digits of the pre-stored valid POP numbers. Note that, in the optimistic lookup search, the search is limited to the pre-stored POP numbers of the country indicated by the user's country code. Pre-stored POP codes of other countries are not searched.

If an exact, unique match is found between the rightmost AC+LN digits of the raw POP string and the rightmost AC+LN digits of one of the pre-stored POP numbers for the identified country, then it is determined in step 325 that the raw POP string contains a valid POP number, namely the valid POP number whose rightmost AC+LN digits matched those of the raw POP string. If the comparisons performed in step 320 fail to produce an exact, unique match, step 320 is repeated for each of the remain POP rules for that country until an exact unique match is found or until the search has been conducted with all of the POP rules for the country (step 330). Note that many countries may have only a single POP rule (e.g., in the U.S. the area code is always three digits and the local number is always seven digits and K=1), while other countries may have multiple POP rules (e.g., Germany) which may require step 320 to be repeated for each rule until a match is found. Preferably, where a country has more than one POP rule, the rules are sorted in descending order from longest to shortest (length=AC+LN), and searching is conducted in order of descending POP rule length. In FIG. 5, the looping through of the set of POP rules is represented by incrementing a POP rule index and repeating step 320 with POP rule(I) until an exact, unique match is found or the index I equals the total number of POP rule K.

If, in the first stage of the optimistic lookup search, no match is found between the rightmost AC+LN digits of the raw POP string and those of the pre-stored valid POP number of the country for any of the POP rules of the country, a second search stage is performed under the optimistic lookup search. Specifically, another lookup search is conducted by concatenating the independently-supplied user area code with the rightmost LN digits of the raw POP string (i.e., the portion of the raw POP string that represents the local number), thereby forming a concatenated string of AC+LN digits (step 335). Beginning with the first listed POP rule (POP rule(1)) for the calling country, the concatenated digits are compared with the rightmost AC+LN digits of the POP numbers in the lookup phone book corresponding to the user's country (step 340). If an exact, unique match is found between the concatenated digits and the rightmost AC+LN digits of one of the pre-stored POP numbers for the identified country, then it is determined at step 345 that the raw POP string contains a valid POP number, namely the valid POP number whose rightmost AC+LN digits matched those of the concatenated digits. If no match is found, steps 335 and 340 are repeated for each of the country's K listed POP rules until a match is found or until all the POP rules for that country have been tried (step 350). The second search stage of the optimistic lookup search is essentially the same as the first search stage, except that the user-configured area code has been substituted for the digits of the raw POP string that were assumed to be the area code in the first optimistic search approach.

Note that the second stage of the optimistic lookup search will produce an exact, unique match in the case where the user is not required to dial the area code in order to connect to the POP, whereas the first stage will fail to obtain a match in this case, since the area code is not reflected in the raw POP string. Since requirements to dial the area code presently are not universal, in practice, the second stage of the optimistic lookup search may correctly determine the identity of the POP associated with the data record in a great number of instances where the first stage does not. Further, if the local number portions of the POP numbers in the lookup phone book are not unique, and the user did not dial the area code, the method of present invention can rely on the user-configured area code to uniquely match the raw POP string to one of the pre-stored POP numbers in accordance with the second stage of the optimistic lookup search.

If the second stage of the optimistic lookup search fails to produce an exact, unique match between the concatenated digits and the rightmost AC+LN digits of the pre-stored POP numbers of the user's calling country, a third stage of the optimistic lookup search is performed. In the third stage, the area code information is disregarded, and an attempt is made to match only the local number. Specifically, in accordance with the first-listed POP rule (POP rule(1)) of the calling country, the rightmost LN digits of the raw POP string are selected and compared with the rightmost LN digits of each of the POP numbers in the lookup phone book for the country (step 355). If an exact, unique match is found between the rightmost LN digits of the raw POP string and the rightmost LN digits of one of the pre-stored POP numbers, then it is determined in step 360 that the raw POP string contains a valid POP number, namely the valid POP number whose rightmost LN digits matched those of the raw POP string. If the rightmost LN digits of the raw POP string match the rightmost LN digits of two or more of the pre-stored POP numbers, and if the matching pre-stored POP numbers all correspond to the same service provider, the POP is determined in step 365 to be a valid POP. However, the POP is identified only by the local number (i.e., the rightmost LN digits of the matching pre-stored POP numbers) rather than by a complete, unique POP number having both an area code and a local number. If no match is found between the rightmost LN digits of the raw POP string and the rightmost LN digits of any of the pre-stored POP numbers, then step 355 is repeated for each of the K POP rules in the list until one or more matches is found or step 355 has been performed for all K POP rules for the country (step 370). If, after performing step 355 for all the POP rules of the country, no match has been found, the optimistic lookup search is terminated without declaring a match, and a final pessimistic lookup search is performed.

By performing the optimistic lookup search only after the initial pessimistic lookup search fails, the present invention relies on the user-supplied country code and area code correct only when an exact, unique match cannot be achieved through a simple comparison of raw POP string digits and digits of a valid POP number in the lookup phone book. This approach has the advantage of avoiding possible inaccuracies of the supplemental county and area code information where possible, while still taking advantage of this supplemental information where necessary. Unlike the initial pessimistic lookup search, which involves a broad search of valid POP numbers while relying on minimum information (i.e., only the raw POP string), the optimistic lookup search involves a much narrower search of valid POP number of the calling country using refined search criteria derived from a greater amount of information (i.e., the raw POP string, the country code, the area code, and the service provider) to refine the search criteria.

While the optimistic lookup search of the exemplary embodiment relies in a particular manner on the user's country code and, in some cases, on the area code and the service provider identifier, it should be understood that the optimistic lookup search of the present invention encompasses information-assisted searches that involve or are aided by supplemental information in addition to the raw POP string itself. Thus, the optimistic lookup search can involve a subset of the country code, area code and service provider identifier or any combination of these and any other supplemental identifier information that may be useful in correctly determining the identity of the POP. Moreover, the particular stages of the optimistic lookup search and the processing and decisions performed within each of the stages may vary in accordance with the particular supplemental information relied upon and how it is being relied upon.

Referring again to FIG. 3, if the optimistic lookup search fails to successfully identify a valid POP number in the lookup phone book matching the raw POP string, the user-configured information used in the optimistic lookup search is distrusted, and a final "pessimistic" lookup search is performed (step 400). Like the initial pessimistic lookup search, the final pessimistic lookup search does not rely on supplemental information, such as the user's country or the area code, in attempting to identify a valid POP number that matches the raw POP string; thus, the final pessimistic search is a broad lookup search relying on a minimum amount of information (i.e., only the raw POP string). However, the final pessimistic lookup search is more "lenient" than the initial pessimistic lookup search in that raw POP string matches to multiple pre-stored POP numbers are treated as acceptable matches, and attempts to match the rightmost digits continue with successively fewer digits down to a significantly smaller number of digits before stopping the search. In this manner, at least some information about the POP's identity (albeit potentially imperfect information) may be gleaned from the raw POP string.

Figure 6:
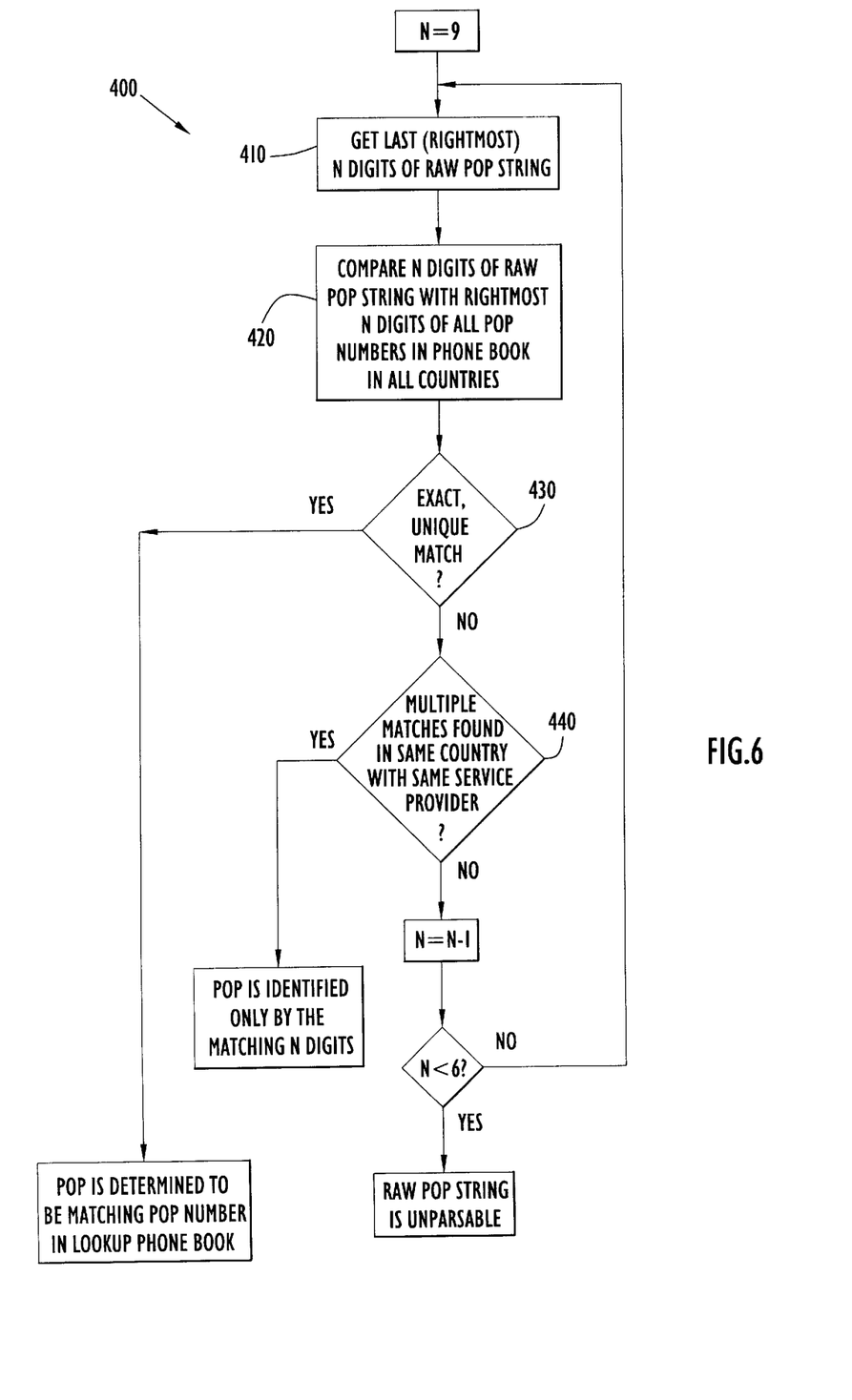
FIG. 6 is a functional flow diagram illustrating the processing steps of the final pessimistic lookup search performed in accordance with the present invention.

As shown in FIG. 6, the final pessimistic lookup search begins by selecting the rightmost N digits of the raw POP string, where N is initially set to a value of nine (step 410). The N digits of the raw POP string are compared with the rightmost N digits of each of the POP numbers contained in the lookup phone book for every country (step 420). If an exact, unique match is found between the N digits of the raw POP string and the N digits of one of the POP numbers in the lookup phone book, then it is determined in step 430 that the raw POP string contains a valid POP number, namely the valid POP number whose rightmost digits matched those of the raw POP string. If the rightmost N digits of the raw POP string produce an exact match with the rightmost N digits of more than one of the POP numbers in the lookup phone book, and if all of the matching pre-stored POP numbers correspond to the same country and to the same service provider, it is determined in step 440 that the raw POP string contains a valid POP number. However, the POP is identified only by the rightmost N digits of the raw POP string that matched. This essentially amounts to a partial or incomplete validation of the POP number of the uploaded data record.

If no matches are found between the rightmost N digits of the raw POP string and the rightmost N digits of any of the POP numbers in the lookup phone book, the value of N is decremented, and the process is repeated, as shown in FIG. 6, until N is decrement below six. Thus, steps 410, 420, 430 and 440 are repeated first by comparing the rightmost eight digits of the raw POP string with the rightmost eight digits of each of the POP numbers contained in the lookup phone book for every country. If the process fails to produce a match with the rightmost eight digits, N is decremented to seven. If no match is found with N equal to seven, N is decremented to six. If no match is found with N equal to six, the raw POP string is determined to be unparsable and the search process is terminated.

Note that there is a small chance of a random match if the digits of the raw POP string are not, in fact, a phone number. In the final pessimistic lookup search, as few a six digits may be compared. Given a phone book of 3000 POPs, there exists only a 0.3% of a false match with a random 6-digit number assuming a uniform distribution. Even if the raw POP string and stored valid POP numbers do not have an exact uniform distribution, it can be readily be seen that the likelihood of a false match is quite small.

The terms "optimistic" and "pessimistic" refer to the degree to which the search method relies on user-configured information supplied by the end-user's computer, with the "pessimistic" searches essentially assuming that the user-configured information is unreliable and therefore not relying upon this information. In the initial pessimistic lookup search, there is no reliance at all on the user-configured information, and the search is based on a longer string of digits (i.e., eight or nine), thereby reducing the chances of an incorrect match. In the optimistic lookup search, user-configured information is assumed to be reliable, and progressively more user-configured information is introduced in each of the three stages (country code, then area code, then service provider if needed) with each stage being more "optimistic" in relying upon increasingly more of the user-configured information. If unsuccessful, the final pessimistic lookup search reverts to the original assumption that the user-configured information is unreliable and again relies only on the raw POP string itself in attempting to find a POP number match. However, the final pessimistic lookup search is more lenient that the initial pessimistic lookup search in that a smaller number of matching digits are considered a valid match and even multiple matches will be considered valid (albeit imperfect) matches.

The POP identification technique of the present invention can be used in conjunction with conventional parsing algorithms. For example, the aggregator can be configured to allow an operator to select either the POP identification method of the present invention or a conventional raw POP string parsing algorithm. Further, if the POP identification method of the present invention fails match the raw POP string to a valid POP number, a conventional parsing algorithm can subsequently be applied to raw POP string in a further attempt to extract a valid POP number, such as the algorithm described in the aforementioned Chu et al. patent application.

The POP identification technique of the present invention is designed to minimize the probability of matching a raw POP string with an incorrect POP number, while maximizing the probability of matching the raw POP string with the correct POP number when the raw POP string, in fact, represents a valid POP number. In experimental tests, the novel combination of the pessimistic and optimistic search techniques of the present invention achieves a substantially higher matching percentage than more difficult to maintain conventional parsing algorithms, and works well across phone and dialing conventions in most countries in the world. Thus, the POP identification method of the present invention permits substantially more end-user data to be correctly associated and aggregated, thereby yielding more meaningful network monitoring information useful for more accurately assessing network performance, troubleshooting problems within the network system, and planning network development.

While the present invention has been described in the context of identifying POP telephone numbers in order to associate, aggregate and organize data records according to common POP numbers, it will be understood that the concept of the present invention applies to any data record identifier that could potentially be useful for categorizing data records or associating data records in a relational database. Thus, for example, where network performance data is being aggregated and reported on a service provider basis (i.e., data records are being separated and sorted based on who the service provider is) to provide an overall comparison of different service providers, the technique of the present invention could be used to validate that the service provider information uploaded with each data record corresponds to a valid, pre-stored service provider identifier. Likewise, if network performance data is being aggregated on a country-by-country basis, an area-code-by-area-code basis or on an equipment manufacturer basis, the technique of the present invention could be applied to validate that uploaded information corresponds to a valid country, area code or OEM. Note, however, that the present invention is particularly useful for identifying the POP number within a data record, since identification of a POP number is inherently more challenging given that the POP number is contained within a larger character string whose attributes and contents may not be fully known and may vary considerably from data record to data record. Moreover, while POPs are commonly used to connect end users to communication networks, the present invention can be used to associate data records in accordance with any type of network connection node that is identified within the data record.

Furthermore, the present invention is also applicable to systems that collect and aggregate data other than network monitoring data and that generate reports and statistical information therefrom, where identification or validation of data record identifiers used to categorize, organize, correlate, associate or group the data is desirable.

Having described preferred embodiments of new and improved method of identifying information within a character string, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. In a system for organizing and associating a collection of data records in accordance with data record identifiers that indicate common attributes among sets of data records within the collection, a method of validating that a data segment within a data record is an identifier that matches one of a number of pre-stored identifiers, comprising the steps of:

(a) storing a set of valid identifiers;

(b) comparing the rightmost N digits of the data segment with the rightmost N digits of valid identifiers from the set of stored valid identifiers, where N is a positive integer; and (c) determining that the data segment is a certain one of the valid identifiers when the digits of the data segment match the digits of the certain one of the valid identifiers.

2. The method of claim 1, wherein the data segment is contained within a data field of the data record, the method further comprising the step of:

(d) extracting the data segment from the data field by stripping out at least some portions of the data field other than the data segment.

3. The method of claim 1, wherein the data segment is a point of presence (POP) string identifying a POP corresponding to the data record, and the set of valid identifiers is a set of valid POP numbers, stored in a lookup phone book, that identify actual POPs in a communication network.

4. The method of claim 3, wherein the data string is embedded in a string with other data.

5. The method of claim 1, wherein step (b) includes:
performing a broad search involving comparison of the selected digits of the data segment with digits of the complete set of stored valid identifiers.

6. The method of claim 1, wherein step (b) includes:
performing an information-assisted search by comparing selected digits of the data segment with digits of only certain ones of the stored valid identifiers, wherein the certain ones of the stored identifiers are selected in accordance with supplemental information relating to the data record.

7. The method of claim 1, wherein:
the data segment is a point of presence (POP) string identifying a POP corresponding to the data record, and the set of valid identifiers is a set of valid POP numbers, stored in a lookup phone book, that identify actual POPs in a communication network; and
the initial search includes: comparing the rightmost N digits of the POP string with the rightmost N digits of the valid POP numbers in the lookup phone book; and, if an exact, unique match is found between the rightmost N digits of the POP string and the rightmost N digits of one of the stored valid POP numbers, determining that the data record corresponds to the POP identified by the matching valid POP number.

8. The method of claim 7, wherein the rightmost N digits of the POP string are compared to the rightmost N digits of valid POP numbers from more than one country.

9. The method of claim 7, wherein the initial search further includes decrementing the value of N and repeating the initial search if no match is found between the rightmost N digits of the POP string and the rightmost N digits of any of the stored valid POP numbers.

10. The method of claim 9, wherein the value of N is initially set to nine and decremented to eight.

11. The method of claim 1, wherein, if the initial search fails to produce a match, step (b) further includes performing an information-assisted search using supplemental information about the data record to refine search parameters for identifying a match between the data segment and a valid identifier from the set of stored valid identifiers.

12. The method of claim 11, wherein:
the data segment is a point of presence (POP) string identifying a POP corresponding to the data record, and the set of valid identifiers is a set of valid POP numbers, stored in a lookup phone book, that identify actual POPs in a communication network; and
the information-assisted search includes: identifying information in the data record indicating a country of origin of the data record; and narrowing the search for a matching valid POP number to stored valid POP numbers from the country of origin.

13. The method of claim 12, wherein a first stage of the information-assisted search includes:
retrieving a list of K POP rules each specifying a number of area code digits (AC) and a number of local number digits (LN) for a type of POP number format used in the country of origin, where K is the number of different POP number formats used in the country of origin;
for one of the POP rules, comparing the rightmost AC+LN digits of the POP string with the rightmost AC+LN digits of the valid POP numbers from the country of origin and, if an exact, unique match is found between the rightmost AC+LN digits of the POP string and the rightmost AC+LN digits of one of the stored valid POP numbers, determining that the data record corresponds to the POP identified by the matching valid POP number; and
if no match is found in the preceding step, repeating the preceding step with others of the K POP rules until an exact, unique match is found or all K POP rules have been tried.

14. The method of claim 13, wherein, if the first stage of the information-assisted search fails to find a match, a second stage of the information-assisted search includes:
identifying information in the data record indicating an area code of the data record;
for one of the POP rules, concatenating the area code and the rightmost LN digits of the POP string;
comparing the concatenated digits with the rightmost AC+LN digits of the valid POP numbers from the country of origin and, if an exact, unique match is found between the concatenated digits and the rightmost AC+LN digits of one of the stored valid POP numbers, determining that the data record corresponds to the POP identified by the matching valid POP number; and
if no match is found in the preceding step, repeating the preceding step with others of the K POP rules until an exact, unique match is found or all K POP rules have been tried.

15. The method of claim 14, wherein, if the second stage of the information-assisted search fails to find a match, a third stage of the information-assisted search includes:
identifying information in the data record indicating a service provider corresponding to the data record;
for one of the POP rules: comparing the rightmost LN digits of the POP string with the rightmost LN digits of the valid POP numbers from the country of origin; if an exact, unique match is found between the rightmost LN digits of the POP string and the rightmost LN digits of one of the stored valid POP numbers, determining that the data record corresponds to the POP identified by the matching valid POP number; and, if matches are found between the rightmost LN digits of the POP string and the rightmost LN digits of plural valid POP numbers all corresponding to a same service provider, determining that the data record corresponds to the POP identified only by the rightmost LN digits of the POP string; and
if no match is found in the preceding step, repeating the preceding step with others of the K POP rules until a match is found or all K POP rules have been tried.

16. The method of claim 11, wherein, if the information-assisted search fails to produce a match, step (b) includes performing a final search by comparing the rightmost N digits of the data segment with the rightmost N digits of valid identifiers from the set of stored valid identifiers with successively smaller values of N until the compared digits of the data segment match the digits of at least one of the stored valid identifiers or until the value of N reaches a predetermined minimum value.

17. The method of claim 16, wherein:
the data segment is a point of presence (POP) string identifying a POP corresponding to the data record, and the set of valid identifiers is a set of valid POP numbers, stored in a lookup phone book, that identify actual POPs in a communication network; and
the final search includes: comparing the rightmost N digits of the POP string with the rightmost N digits of the valid POP numbers in the lookup phone book; if an exact, unique match is found between the rightmost N digits of the POP string and the rightmost N digits of one of the stored valid POP numbers, determining that the data record corresponds to the POP identified by the matching valid POP number; and, if a match is found between the rightmost N digits of the POP string and the rightmost N digits of plural of the stored valid POP numbers, determining that the data record corresponds to a POP identified only by the rightmost N digits of the POP string.

18. The method of claim 17, wherein the rightmost N digits of the POP string are compared to the rightmost N digits of valid POP numbers from more than one country.

19. The method of claim 18, wherein the data record is identified by the rightmost N digits of the POP string matching the rightmost N digits of plural stored valid POP numbers only when the plural stored valid POP numbers all correspond to a same country and a same service provider.

20. The method of claim 17, wherein the final search further includes decrementing the value of N and repeating the final search if no match is found between the rightmost N digits of the POP string and the rightmost N digits of any of the stored valid POP numbers, until a match is found or N is decremented to a predetermined minimum value.

21. The method of claim 20, wherein the value of N is initially set to nine and the predetermined minimum value is six.

22. A method of determining whether or not a string within a data field of a data record contains a valid identifier of a point-of-presence (POP) corresponding to the data record, the method comprising the steps of:
(a) storing a set of valid POP numbers that identify actual POPs in a communication network;
(b) extracting the string from the data field;
(c) comparing digits of the string to digits of the valid POP numbers; and
(d) determining that the string contains a valid POP identifier when the digits of the string match the digits of a valid POP number in the set.

* * * * *